May 10, 1966  J. T. BEESTON, JR  3,250,991
TEMPERATURE MEASURING BRIDGE CIRCUIT HAVING A PAIR OF ZENER
DIODES AS PART OF THE BRIDGE CIRCUIT
Filed June 29, 1962  3 Sheets-Sheet 1
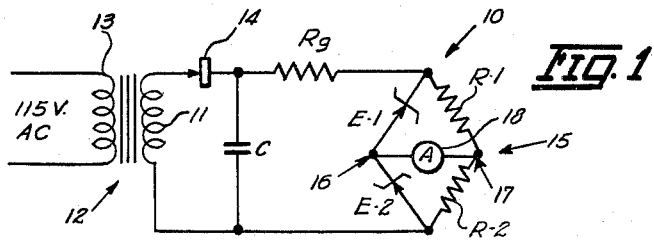
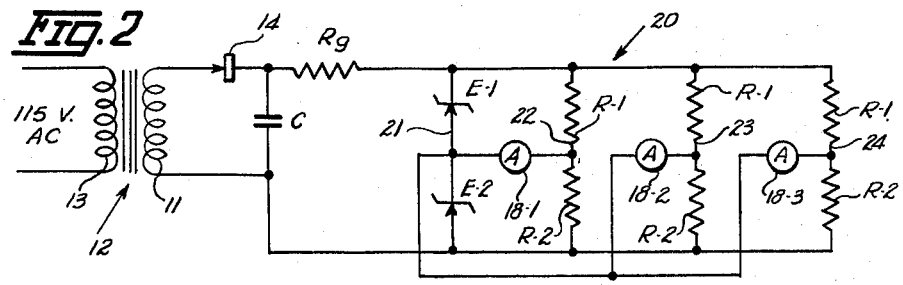
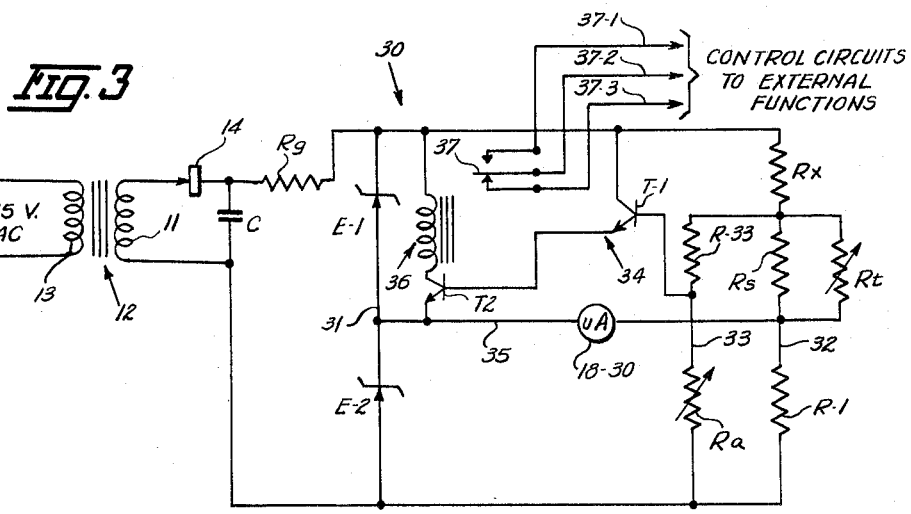
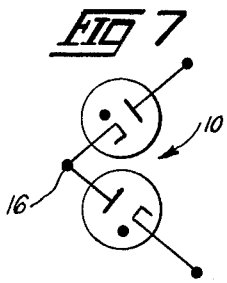
INVENTOR.
JOHN T. BEESTON, JR.
BY *Morton S. Adler*
ATTORNEY.

INVENTOR.
JOHN T. BEESTON, JR.
BY Morton S. Adler
ATTORNEY.

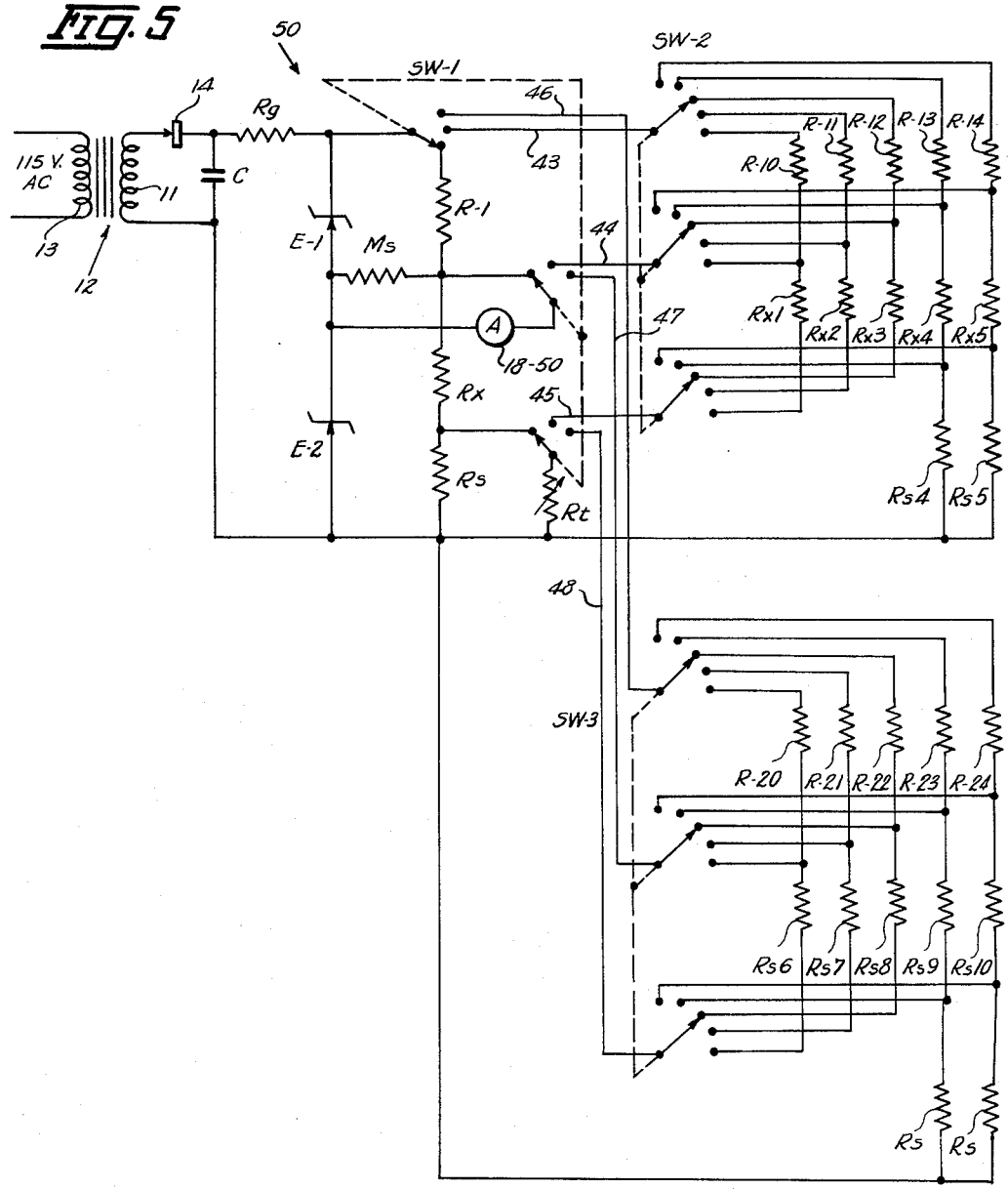

United States Patent Office 3,250,991
Patented May 10, 1966

3,250,991
TEMPERATURE MEASURING BRIDGE CIRCUIT HAVING A PAIR OF ZENER DIODES AS PART OF THE BRIDGE CIRCUIT
John T. Beeston, Jr., Des Moines, Iowa, assignor to Frontier Development, Inc., Des Moines, Iowa, a corporation of Iowa
Filed June 29, 1962, Ser. No. 206,364
6 Claims. (Cl. 324—62)

The present invention relates to bridge circuits, and to various applications of the bridge circuits. More particularly, the present invention relates to a bridge circuit in which a potential arm across the applied voltage comprises constant potential devices.

The ordinary Wheatstone bridge is conventionally made up of two arms which are in parallel and are connected across the applied voltage, each arm having a pair of resistors in series; a measuring instrument connected between the midpoints of the two arms is utilized to measure the current flow. One of the major uses to which the Wheatstone bridge circuit is put is that of giving an indication of a physical change which results in variation of the resistance of one resistor of the four resistors in the Wheatstone bridge, while the remaining three resistors have resistance values which are not varied or changed.

Where the Wheatstone bridge has been used as a circuit for measuring a physical change, the resistance within the network which results from the physical change being measured itself causes a change in the voltage across the bridge, since the voltage is essentially unregulated and is dependent upon the resistance of the Wheatstone bridge network. Thus, limitations in the accuracy of the measurements obtainable necessarily existed with the known, simple Wheatstone bridge circuitry, and efforts to improve upon this accuracy, particularly over a wide range, resulted in extremely complex and consequently expensive circuitry.

In many instrumentation applications, it is often desirable to determine the physical change in a number of individual units. For example, it is often desirable to determine the temperature in several units or cells forming a part of a relatively large installation. In such an application, it is conventional to provide a complete, separate Wheatstone bridge circuit for each of the units or cells, with either a plurality of meters, or a single meter with appropriate switching mechanism, so that the temperature in each of the units or cells could be determined. As will be apparent, such instrumentation installations require a great number of electrical components, such as the resistors going in to make up the various Wheatstone bridges.

Also in the multiple unit instrumentation field, it is often desirable to maintain a constant observation of the temperature or other physical parameter in the several units or cells, and to actuate various control devices in accordance with the physical changes. For example, in some installations it is desirable to control heat energy input to chemical processing equipment in accordance with the temperature at a given point or points in the processing equipment. Heretofore, control signals have been utilized to actuate the necessary control devices, such as solenoid valves, but the generation of such control signals has not been both reliable and readily obtained with an economic use of equipment. In particular, with the known Wheatstone bridge applications, obtaining control signals has heretofore not been satisfactorily accomplished, one difficulty being that the generation of the control signals in many constructions interfered with the operation of the main Wheatstone bridge circuitry. This was due to the fact that the control signals altered the value of the currents and voltages which would have existed in the Wheatstone bridge had the control signal apparatus not been present.

A further application of the Wheatstone bridge in the instrumentation field is where the sensitivity range of the measurements is to be changed. This has not heretofore been readily obtainable with sufficient accuracy and economy.

While the maintenance of a constant potential across the bridge is most desirable for accuracy, prior circuits have not been as accurate as desirable due to inferior voltage regulation.

An object of the present invention is to provide an improved Wheatstone bridge circuit.

Another object of the present invention is the provision of a Wheatstone bridge circuit of high accuracy and extreme simplicity.

A further object of the present invention is to provide an improved circuit for measuring physical changes utilizing fewer components than in circuitry heretofore known.

A still further object of the present invention is the provision of Wheatstone bridge circuitry which will provide for the generation of control signals, and which circuitry will not be adversely affected by the generation of such control signals.

Another object of the present invention is to provide an improved fractional bridge measuring circuit.

Yet another object of the present invention is the provision of a fractional measuring circuit requiring the use of a relatively few parts.

Another object of the present invention is the provision of Wheatstone bridge circuitry capable of determining with relatively great accuracy the value of a physical parameter being measured.

A further object of the present invention is to provide a measuring circuit, including a Wheatstone bridge, in which superior voltage regulation is maintained.

Other objects and many of the attendant advantages of the present invention will be readily understood from the following specification and drawing, wherein:

FIG. 1 is a circuit diagram of a simple Wheatstone bridge circuit in accordance with the present invention.

FIG. 2 is a circuit diagram illustrating a Wheatstone bridge circuit utilizing the present invention and comprising more than two potential arms in parallel.

FIG. 3 is a circuit diagram illustrating a bridge circuit in accordance with the present invention capable of generating control signals.

FIG. 5 is a circuit diagram of a further embodiment hereof in which a circuit similar to that shown in FIG. 4 is used, but with which even more sensitive measurements can be made.

FIG. 7 is a partial schematic view of the circuit of FIG. 1 using gas discharge tubes in place of zener diodes.

Figure 4:
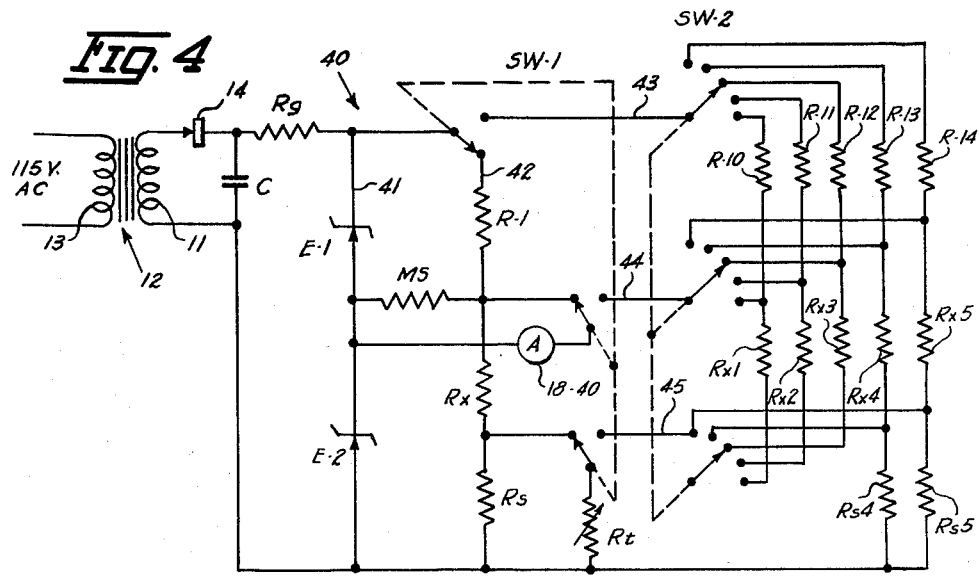
FIG. 4 is a circuit diagram of a Wheatstone bridge circuit in accordance with the present invention and providing for the high accuracy measurement of a variable parameter.

Referring now to the drawings, wherein like or corresponding reference numerals are used to designate like or corresponding parts throughout the several views, there is shown in FIG. 1 a measuring circuit generally designated 10 comprising the secondary 11 of a transformer 12, the primary 13 of which is connected with a suitable A.C. source. The secondary 11 is connected through a rectifier 14 and resistor Rg to one end of a Wheatstone bridge circuit 15, the other end of bridge circuit 15 being directly connected with the other side of secondary 11. An appropriate capacitor C is connected in parallel with the bridge circuit 15. The resistor Rg and capacitor C provide a filtered D.C. supply.

Bridge circuit 15 itself comprises a first arm generally designated 16 having therein two constant potential devices E-1 and E-2 connected in series. The second arm 17, in parallel with the arm 16, includes two resistors R-1 and R-2, connected in series; as will be apparent, one or the other of the resistors R-1 or R-2 is a constant value resistor, and the other resistor is so constructed that its resistance value will change proportionately to the change in value of a physical parameter to be measured, such as temperature. The constant potential devices E-1 and E-2 may comprise, for example, zener diodes as shown in FIG. 1 or gas discharge tubes as shown in FIG. 7.

An indicating meter, such as an ammeter 18 is connected in between the two arms 16 and 17 of the bridge circuit 15, in known manner. The indicating meter current is given by the following expression:

$$i_m = \frac{E_2 R_1 - E_1 R_2}{R_1 R_2 + R_m R_1}$$

where $E = E_1 + E_2$ the applied voltage
$R_1$ and $R_2$ = resistance of the bridge resistors
$R_m$ = meter resistance.

As will be apparent, this expression of the bridge shown in FIG. 1 is much simpler than the corresponding expression commonly used for the standard Wheatstone bridge in which four resistors are used. This stems from the fact that one of the resistance arms of the circuit shown in FIG. 1 comprises not a pair of resistors in series, but instead a pair of constant potential devices in series.

As a result, a wider variation in value of the variable resistor is possible with the circuit shown in FIG. 1, without a diminution in the accuracy of the reading obtainable by the meter 18, due to superior voltage regulation. Further, even for a relatively smaller range in value of the variable resistor, the bridge circuit of FIG. 1 will be more accurate than the common Wheatstone bridge circuit.

It will also be observed that with the bridge circuit shown in FIG. 1, the applied voltage across the bridge, when connected to the bridge 15 in series with the grid resistance Rg, becomes self regulated; the constant potential devices E-1 and E-2 present a regulated voltage across the bridge which is the sum of the voltages or voltage drops in the two constant potential devices E-1 and E-2. This regulated voltage materially aids in keeping constant the various components of the equation, other than that of the resistance of the variable resistor. This will, of course, give improved and highly accurate results.

Referring now to FIG. 2, there may be seen a circuit including a transformer 12 having secondary 11 and primary 13, the secondary 11 being connected through the rectifier 14 and resistor Rg to a bridge circuit generally designated 20, a capacitor C being connected, as in FIG. 1, in parallel with the secondary 11. One arm 21 of the bridge circuit 20 comprises a pair of constant potential devices E-1 and E-2 in series, and there are provided in parallel with the arm 21 other arms 22, 23 and 24. It will be understood that while a total of four arms are shown in the circuit 20, there may be either more or less such arms. Each of the arms, other than arm 20, includes a pair of resistors R-1 and R-2 in series. Connected between junction points on the arms 21 and 22, and between the two elements in each said arm is an ammeter 18-1: similarly, ammeters 18-2 and 18-3 are connected across arms 21 and 23, and 21 and 24, respectively.

Assuming that each of the resistors R-2 is a variable resistor and is placed in an environment having a variable physical parameter to be measured, the several resistors R-2 will each vary in accordance with the variations in the physical parameters in their respective environments, and an indication of the value of the physical parameter may be read on each of the meters 18-1, 18-2, 18-3. As will be apparent, each of the bridge arms 22, 23 and 24 operates from and in parallel with the same bridge arm 21, and each of the meters 18-1, 18-2, and 18-3 will operate independently of the other. This result is highly desirable, and is obtainable because of the fact that the constant potential devices E-1 and E-2 will admit differing currents through them and yet maintain a constant voltage within a very wide range.

Referring now to FIG. 3, there is shown a circuit generally designated as 30 and having therein the transformer 12, rectifier 14, capacitor C and resistor Rg. Across the conductors leading from the secondary 11 is a first bridge arm 31 having therein constant potential devices E-1 and E-2. The second arm 32 of the bridge network is in parallel with the arm 31 and comprises the fixed resistor R-1 which is in series with a shunt resistor Rs, which latter is in parallel with a resistor Rt that varies in accordance with an environmental factor, such as temperature, the arm 32 further including a resistor Rx. In parallel with the portion of arm 32 comprising resistors R-1, Rs and Rt, there is a third arm 33 comprising an adjustable resistor Ra and an additional resistor R-33. An input terminal of an amplifying circuit, generally designated 34 is connected to the junction between the two resistors in arm 33. The amplifying circuit 34 includes the transistors T-1 and T-2, coupled as shown with the emitter of transistor T-1 connected with the base of transistor T-2 and the collector of transistor T-2 being connected to the coil of a relay 36. Relay 36 incldes a switch 37 to which are connected the leads 37-1, 37-2 and 37-3. The emitter of transistor T-2 is connected to the junction between devices E-1 and E-2. Suitable biasing of the transistors may be provided, if necessary, as is well known in the art. A milliammeter 19-30 is connected to a junction between devices E-1 and E-2 and to a junction between resistors R-1 and Rs.

In the operation of the circuit shown in FIG. 3, not only will the milliammeter 18-30 indicate the temperature or other condition being measured by the circuit 30, and including the resistor Rt, but also current flowing in the circuit, and particularly in arm 33, will be amplified by amplifying circuit 34 so as to actuate, when a given or predetermined value exists, the relay 36 so as to actuate switch 37 and send a control signal through one group or the other of the leads 37-1, 37-2 and 37-3. The current flowing in the amplifying circuit 34 will not affect either the reading of the milliammeter 30 or the values obtaining in the circuit 30, due to the functioning of the constant potential devices E-1 and E-2 in the arm 31. Thus, the control signals generated may control suitable devices, much as solenoid operated valves, but the control signals will in no way affect the operation circuit 30, as previously mentioned.

In FIG. 4, there is shown a circuit in which a transformer secondary 11 is connected through the rectifier 14 and filtering capacitor C, by means of the resistor Rg, to the bridge network 40.

A first arm 41 of bridge circuit 40 comprises the constant potential devices E-1 and E-2.

A second arm 42 of the bridge network 40 includes the fixed resistor R-1, a resistor Rx and the resistor Rt, which has in parallel with it a shunt resistor Rs. An ammeter 18-40 is connected between the arms 41 and 42, specifically between the junction between constant potential devices E–1 and E–2 on one hand and the junction between fixed resistance R–1 and the remaining resistances, on the other hand. In parallel with the ammeter 18–40 is a meter shunt resistance Ms.

A transfer switch SW–1 is provided and serves to disconnect the arm 42 from the circuit and to connect the input to a conductor 43, the ammeter to a conductor 44, thereby eliminating the meter shunt Ms, and to connect the resistor Rt with a conductor 45. A switch SW–2, functioning as a selector switch, may be set to connect the several conductors 43, 44 and 45 with resistors R–10, R–11, R–12, R–13 or R–14, these corresponding to the resistance R–1 but being of different values with respect thereto and with respect to each other. The conductor 45 serves to connect in the circuit one of the resistors R–x1, R–x2, R–x3, R–x4, R–x5. When the selector switch SW–2 is set to connect conductor 45 with either resistor Rx–4 or Rx–5, a shunt resistor Rs–4 or Rs–5, respectively, will be connected in parallel with the resistor Rt. The conductor 44 may be set to connect the ammeter with either one of the arms which include, for example, resistor R–10 and resistor Rx–1, in correspondence with the connections obtained by the contacts connected with conductors 43 and 45.

The circuit disclosed in FIG. 4 may be used as follows. Assuming the selector switch SW–1 is in the position shown in full lines, an operator will observe the scale of the ammeter 18–40. This scale may read, for example from 0 to 100 degrees Fahrenheit. If a reading of approximately 45 degrees is indicated by the ammeter 18–40, the operator may wish to determine the temperature with greater precision. In order to do this, it is only necessary for the operator to shift the transfer switch SW–1 from the position shown in solid line on FIG. 4, thereby placing in circuit the conductors 43, 44 and 45. The selector switch SW–2 may then be manipulated for the desired temperature range. In the illustrative example shown in FIG. 4, there are five sub-ranges of the 0 to 100 degree scale, and so each of the sub-ranges would comprise a 20 degree span. As shown, selector switch SW–2 is set for the range between 40 and 60, and would be the setting selected when the reading is anywhere between 40 and 60, and for the example chosen the reading is 45 degrees. It will then be possible for the operator to read the temperature, as indicated by the ammeter 18–40 to approximately two decimal places.

With an instrument comprising the circuit of FIG. 4, it will be readily understood that a highly accurate temperature reading may be taken.

In FIG. 5, there is shown a circuit which is generally similar to that of FIG. 4, but which is even more accurate; there may be seen a circuit generally designated 50 connected with the secondary of a transformer 12 through rectifier 14, resistor Rg and capacitor C. Circuit 50 has a branch 51 which is substantially the same as branch 41 of circuit 40. There is also provided, as in circuit 40, the transfer switch SW–1 and the selector switch SW–2, which serve to connect in the circuit the various resistors R–10, etc., and Rx–1, etc., as discussed above in connection with FIG. 4. In addition, the selector switch SW–1 in the FIG. 5 embodiment may serve to connect in the circuit the conductors 46, 47 and 48 which lead to the selector switch SW–3. Selector switch SW–3 is utilized to connect in the circuit one or another of the arms including the resistors R–20 to R–24 and Rs–6 to Rs–10.

With the circuit shown in FIG. 5, the operator will first determine wherein the range between 0 and 100 the temperature is, approximately. By then shifting the transfer switch SW–1 so that the conductors 43, 44 and 45 are in circuit, the scale will show a 20 degree span, as with the embodiment of FIG. 4. Having read the scale with the transfer switch SW–1 in this position, this switch will then be shifted so as to connect in circuit the conductors 46, 47 and 48, and then selector switch SW–3 may be manipulated so that the scale of the instrument will now cover an appropriate span of four degrees. Thus, the temperature or other variable may be read with an extremely high degree of accuracy with the embodiment shown in FIG. 5.

In both the embodiment shown in FIG. 4 and the embodiment shown in FIG. 5, selector switches are shown each connecting with five separate branch circuits. It will be understood, of course, that the number of branch circuits which may be connected with each of the selector switches need not be five, as shown in FIGS. 4 and 5, but may be, for example, ten. In such a case, the reading will be as one to ten between the scale settings, rather than one to five as shown in FIGS. 4 and 5.

Figure 6:
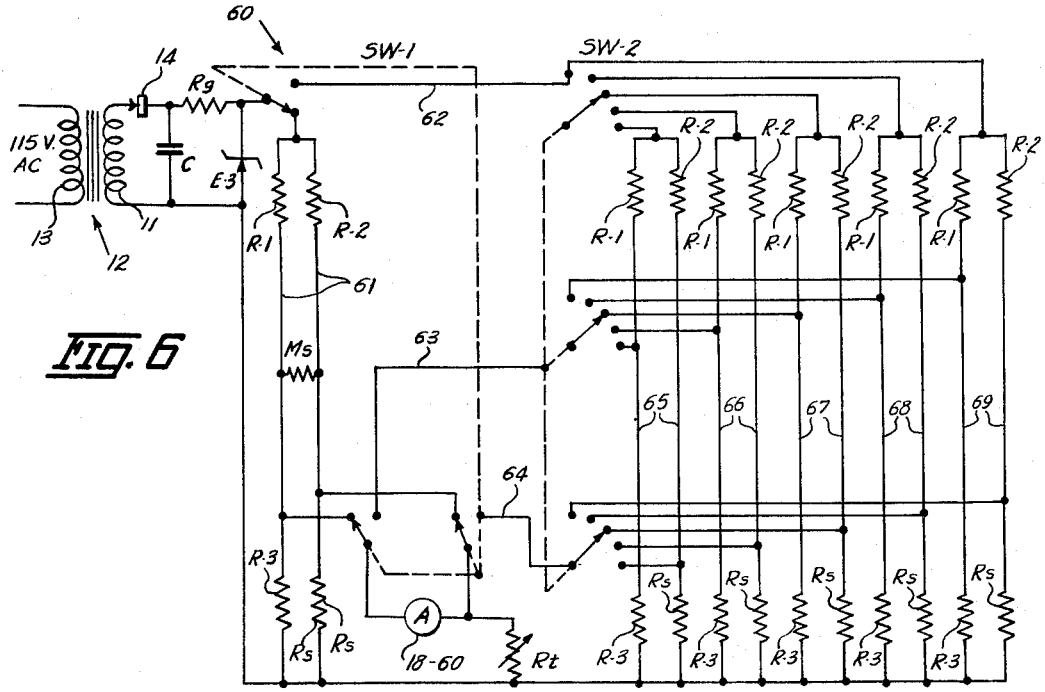
FIG. 6 illustrates another circuit in accordance with the present invention for determining with great accuracy the value of a variable physical parameter.

In FIG. 6, the secondary 11 of the transformer 12 is connected through a rectifier 14 and filtering capacitor C, by means of the resistor Rg to the bridge network generally designated 60, there being a constant potential device E–3 in parallel with the capacitor C for providing self-regulation. A first Wheatstone bridge circuit 61 is provided across which is connected, in usual fashion, an ammeter 18–60. A transfer switch SW–1 may serve to connect in the circuit the conductors 62, 63 and 64. When transfer switch SW–1 is thrown from the solid line position shown in FIG. 6, the bridge circuit 61 is disconnected, and connection is made through conductors 62, 63 and 64 with the selector switch SW–2. Connected to the various contacts of selector switch SW–2 are the bridge circuits 65, 66, 67, 68 and 69, the connection of ammeter 18–60 being also shifted by selector switch SW–2. The circuit of FIG. 6 may be operated in a manner hereinabove described to provide first an approximate full scale reading, and then to in effect expand the scale in the particular region of interest, constant potential device E–3 maintaining superior self-regulation.

There has been provided a greatly improved Wheatstone bridge circuit of high accuracy and extreme simplicity, capable of monitoring multiple cells or units, and capable of emitting control signals, without adverse effect upon the bridge circuitry itself. There has also been provided circuitry in which extreme simplicity of construction with a great sensitivity of reading is obtainable. In each embodiment, high accuracy is obtained with superior self-regulation.

It will be obvious to those skilled in the art that various changes may be made without departing from the spirit of the invention and therefore the invention is not limited to what is shown in the drawings and described in the specification but only as indicated in the appended claims.

What is claimed is:

1. A temperature measuring bridge circuit comprising an A.C. supply, means for rectifying the output of said A.C. supply, filter means for smoothing the output from said means for rectifying, a pair of terminals connected with said filter means to receive the smoothed output therefrom, a pair of arms connected in parallel and across said terminals, one arm having a pair of constant potential electronic valve means therein connected in series for maintaining the potential between said terminals at a constant value, the other arm having a pair of resistor means therein connected in series, one of said resistor means being variable with temperature, and current measuring means connected between respective junctions between said constant potential electronic valve means and said resistor means whereby said measuring means indicates temperature variations in said one resistor means.

2. A temperature measuring bridge circuit as defined in claim 1 wherein said constant potential electronic valve means are zener diodes.

3. A temperature measuring bridge circuit as defined in claim 1 wherein said constant potential electronic valve means are gas discharge tubes.

4. A bridge circuit as defined in claim 1 and further comprising at least a third arm in parallel with said pair of arms, said third arm having a fixed resistor means and the variable resistor means therein in series, the last-mentioned variable resistor means including a temperature sensitive variable resistance, and switching means for selectively connecting said current measuring means between the junction between said resistor means in said respective arms and the junction between said constant potential electronic valve means in said one arm.

5. A bridge circuit as defined in claim 1 and further including an amplifying circuit and control signal means operated by said amplifying circuit, said amplifying circuit being connected in said bridge circuit to amplify variations therein resulting from the effects of temperature on said resistor means variable with temperature, said amplifying circuit being powered solely from said arms.

6. A bridge circuit as defined in claim 5 wherein said amplifying circuit includes first and second transistors, said first transistor having its emitter connected with the base of said second transistor, the collector of said second transistor being connected with said control signal means, and the base of said first transistor being connected with one of said resistor means.

References Cited by the Examiner
UNITED STATES PATENTS

| | | | |
|---|---|---|---|
| 2,468,625 | 4/1949 | Goetz | 175—183 |
| 2,504,965 | 4/1950 | Davis | 324—62 X |
| 2,667,970 | 2/1954 | Bregar | 324—62 X |
| 2,824,279 | 2/1958 | Ferre et al. | 324—1 |
| 2,883,618 | 4/1959 | Nuut | 324—62 |
| 3,008,084 | 11/1961 | Cotton. | |
| 3,068,447 | 12/1962 | Godbey | 340—18 |
| 3,070,744 | 12/1962 | Upton. | |
| 3,087,109 | 4/1963 | Bowers | 323—69 |
| 3,102,981 | 9/1963 | Pulliam | 324—98 |
| 3,115,603 | 12/1963 | Fluegel | 324—60 |

FOREIGN PATENTS

| | | |
|---|---|---|
| 1,134,987 | 4/1957 | France. |
| 297,672 | 6/1932 | Italy. |

WALTER L. CARLSON, *Primary Examiner.*

C. A. S. HAMRICK, E. E. KUBASIEWICZ,
*Assistant Examiners.*